Figure 1:
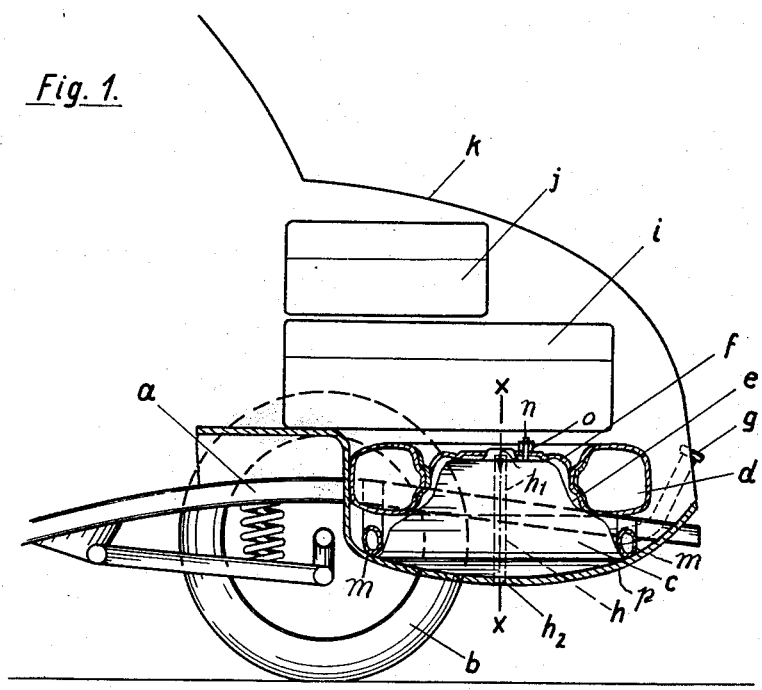

Nov. 24, 1953  J. MÜLLER  2,660,348
ARRANGEMENT AND CONSTRUCTION OF GASOLINE TANKS
Filed Oct. 26, 1949

INVENTOR.
JOSEF MÜLLER
BY
Haseltine, Lake & Co.
AGENTS

Patented Nov. 24, 1953

2,660,348

UNITED STATES PATENT OFFICE 2,660,348

ARRANGEMENT AND CONSTRUCTION OF GASOLINE TANKS

Josef Müller, Stuttgart, Germany, assignor to Daimler-Benz Aktiengesellschaft, Stuttgart-Unterturkheim, Germany Application October 26, 1949, Serial No. 123,598

Claims priority, application Germany November 2, 1948

1 Claim. (Cl. 224—42.14)

This invention relates to an arrangement and construction of gasoline tanks of motor vehicles, especially small cars such as light passenger cars.

For such vehicles it is important to construct and dispose all parts so as to reduce their weight and volume to a minimum. Therefore a main object of this invention is to provide a gasoline tank that has a small weight in relation to its capacity and will occupy little space in the vehicle. A special feature of the invention consists in that the gasoline tank is constructed substantially as a hollow solid of revolution. Another object of the invention is to construct the gasoline tank as a support for a spare wheel, particularly in such a way that the tank and the spare wheel complete one another's shapes to a kind of assembly, thus requiring a very minimum of space. Furthermore the invention aims at utilizing the space lying within the spare wheel for accommodating the gasoline tank or part of it. It is a further object of the invention to mount the gasoline tank which may or may not carry the spare wheel on the bottom of the trunk space.

Other objects and advantages of the invention are to be gathered from the following description of an embodiment.

In the drawing

Figure 2:
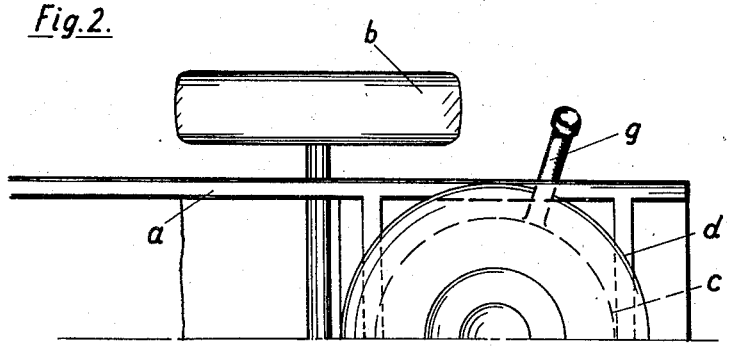

Fig. 1 is a longitudinal section of the rear part of a vehicle being an embodiment of the invention, Fig. 2 is a horizontal view of one end of the vehicle.

On the vehicle frame $a$, behind the rear axle with the rear wheels $b$, there is suspended or supported the gasoline tank $c$ by and attached to any suitable means, e. g. to transverse girders $m$ the tank being disposed between the same. This tank is constructed as a hollow solid of revolution having a vertical axis $x$—$x$ coinciding with the axis of the spare wheel $f$. To receive the latter, the tank is bell-shaped being in its top part reduced to a smaller diameter, the curve $e$ approximately corresponding to the inner profile of the spare wheel and the top diameter of the tank substantially corresponding to the inner diameter of the spare wheel. On this top part of the tank the spare wheel is superposed by means of its wheel disk $f$. For the purpose of attachment the wall of the tank may be provided with at least one rigidly attached upwardly extending threaded bolt $n$ engaging one of the holes conventionally provided in the wheel disk $f$, a nut $o$ being secured to such bolts $n$. The pipe $g$ of the tank is secured to the bottom of the tank below the spare wheel, whereby one may fill the tank without taking off the spare wheel, e. g. from the vehicle's side. For venti-lating the tank there is provided a vertical pipe $h$ axially traversing the former, into which pipe the air contained in the tank and displaced by the gasoline can enter from the top near $h_1$ below a small domelike projection of the tank and from which it can flow out downwards near $h_2$. This will obviate gasoline vapours entering the trunk space or the like or mud particles falling into the tank. At the same time the ventilating pipe is protected against being damaged.

The tank including spare wheel may be located in the longitudinal central plane of the vehicle or, as e. g. in the present embodiment, laterally thereof and below the trunks $i$, $j$ in the trunk space of the car body $k$. The gasoline tank $c$ including the spare wheel $d$, $f$ is located on the bottom $p$ of the trunk space.

What I claim is:

In a motor vehicle, the combination comprising a fuel tank in the shape of a solid of revolution and including a body portion and a dome-like upper portion projecting from said body portion, means for introducing fuel into the body portion of said tank near to the bottom thereof, said body portion defining a support surface for a spare wheel to surround said dome-like portion so that said dome-like portion will extend into the aperture normally forming the hub of the wheel, a venting pipe occupying a substantially vertical position inside the tank with its upper open end inside the tank adjacent the top of said dome-like portion and its lower open end extended through the bottom of the tank to communicate with the atmosphere, a spare wheel superposed on said tank around said dome-like portion and resting on said support, and means securing said wheel in position.

JOSEF MÜLLER.

References Cited in the file of this patent

UNITED STATES PATENTS

| Number | Name | Date |
|---|---|---|
| 262,232 | Kowalevsky | Aug. 8, 1882 |
| 1,289,472 | King | Dec. 31, 1918 |
| 1,421,050 | Washington | June 27, 1922 |
| 1,782,271 | Pennington | Nov. 18, 1930 |
| 2,102,520 | Montmorency | Dec. 14, 1937 |
| 2,155,147 | Nelson | Apr. 18, 1939 |
| 2,314,442 | Cook | Mar. 23, 1943 |
| 2,352,751 | Wright | July 4, 1944 |
| 2,418,178 | Huebshman | Apr. 1, 1947 |

FOREIGN PATENTS

| Number | Country | Date |
|---|---|---|
| 333,219 | Italy | Dec. 23, 1935 |
| 502,049 | Great Britain | Mar. 10, 1939 |
| 611,892 | France | July 19, 1926 |